(«12») United States Patent
Ishizaki et al.

(10) Patent No.: US 12,103,128 B2
(45) Date of Patent: Oct. 1, 2024

(54) MACHINE TOOL

(71) Applicant: TSUDAKOMA KOGYO KABUSHIKI KAISHA, Ishikawa-ken (JP)

(72) Inventors: Junichiro Ishizaki, Ishikawa-ken (JP); Hikaru Ishida, Ishikawa-ken (JP)

(73) Assignee: TSUDAKOMA KOGYO KABUSHIKI KAISHA, Ishikawa-Ken (JP)

( * ) Notice: Subject to any disclaimer, the term of this patent is extended or adjusted under 35 U.S.C. 154(b) by 0 days.

(21) Appl. No.: 18/225,419

(22) Filed: Jul. 24, 2023

(65) Prior Publication Data

US 2024/0066651 A1 Feb. 29, 2024

(30) Foreign Application Priority Data

Aug. 30, 2022 (JP) ................................. 2022-136770

(51) Int. Cl.
*B23Q 16/10* (2006.01)
*B23Q 17/00* (2006.01)

(52) U.S. Cl.
CPC ............. *B23Q 16/10* (2013.01); *B23Q 17/00* (2013.01)

(58) Field of Classification Search
None
See application file for complete search history.

(56) References Cited

U.S. PATENT DOCUMENTS

| 3,010,348 A | * | 11/1961 | Swanson | ................... B23B 7/12 82/138 |
| 3,198,026 A | * | 8/1965 | Thompson | ............. G05B 19/44 192/93 R |
| 10,744,612 B2 | | 8/2020 | Tezuka | |
| 2015/0239087 A1 | | 8/2015 | Itou | |
| 2021/0162556 A1 | | 6/2021 | Kiriki | |

FOREIGN PATENT DOCUMENTS

| JP | 2015-160262 A | 9/2015 |
| JP | 2021-088004 A | 6/2021 |

OTHER PUBLICATIONS

Jan. 3, 2024, European Search Report issued for related EP application No. 23187907.3.

* cited by examiner

*Primary Examiner* — Vicky A Johnson
(74) *Attorney, Agent, or Firm* — Paratus Law Group, PLLC (57) ABSTRACT

A machine tool includes a rotation indexing device and an abnormality determination device. The rotation indexing device including a clamp device configured to maintain a rotary shaft at an indexed angular position and an air purge device configured to supply compressed air to a space within a frame. The abnormality determination device includes a pressure sensor configured to output a pressure signal according to a pressure in a supply pipe conduit of the air purge device, and a determinator configured to determine presence or absence of an abnormality, based on the pressure signal from the pressure sensor.

2 Claims, 5 Drawing Sheets

MACHINE TOOL

CROSS-REFERENCE TO RELATED APPLICATION(S)

This application is based on and claims priority under 35 USC 119 from Japanese Patent Application No. 2022-136770 filed on Aug. 30, 2022, the contents of which are incorporated herein by reference.

TECHNICAL FIELD

The present invention relates to a machine tool including a rotation indexing device for indexing an angular position of a rotation target member attached to an end portion of a rotary shaft, the rotation indexing device including a clamp device configured to maintain the rotary shaft at an indexed angular position and an air purge device configured to supply compressed air to a space within a frame to increase an internal pressure in the space and including a pressure regulator provided in a supply pipe conduit connecting a supply source of the compressed air and the frame.

BACKGROUND ART

The rotation indexing device provided for such a machine tool includes a clamp device for maintaining an angular position of an indexed rotary shaft. In addition, there is a rotation indexing device including an air purge device for supplying compressed air to a space within a frame to increase an internal pressure in the space in order to prevent a coolant liquid or the like from entering the space. Patent Literature 1 discloses an example of such a rotation indexing device.

As for the rotation indexing device disclosed in Patent Literature 1, more specifically, the rotation indexing device includes a clamp mechanism (clamp device) including a space (hereinafter, referred to as a "pressure chamber") for a clamp to which a working fluid is supplied, a piston that operates in an axis line direction of a rotary member (rotary shaft), a brake disc provided not to be rotatable with respect to the rotary shaft, and a braked member fixed to a case (frame). In the rotation indexing device, the working fluid is supplied to the pressure chamber, so that the piston is operated in the axis line direction of the rotary member (rotary shaft) and presses the brake disc against the braked member, and therefore, the rotary shaft is maintained at the indexed angular position.

In addition, the rotation indexing device includes an air purge mechanism (air purge device) connected to a supply source of the compressed air via a supply pipe conduit or the like. In the rotation indexing device, the compressed air is supplied to a space within a case (within a frame) by the air purge device, and a pressure in the space is maintained higher than the atmospheric pressure, so that cutting oil or the like is prevented from entering the space.

Note that, regarding the rotation indexing device provided for such a machine tool, there is one including a rotary joint provided inside the frame in order to supply the working fluid to a jig unit attached to the rotary shaft (rotation target member). Patent Literature 2 discloses an example of such a rotation indexing device.

CITATION LIST

Patent Literature

Patent Literature 1. JP2015-160262A
Patent Literature 2: JP2021-088004A

In the rotation indexing device including the clamp device as disclosed in Patent Literature 1, the space for the clamp to which the working fluid is supplied is sealed with a seal material such as an O-ring. However, the seal performance of the seal material may deteriorate with aging or sliding during use of the rotation indexing device. When the seal performance deteriorates in this way, a state may occur in which the working fluid supplied to the pressure chamber leaks into the space within the frame. In such a state, an operation of the clamp device that is operated by the working fluid is not performed normally, so there may occur a problem in that accuracy of the angular position of the rotation shaft is lowered.

In addition, leakage of the working fluid into the space within the frame may occur not only in the clamp device, but also in the rotary joint of the rotation indexing device disclosed in Patent Literature 2. That is, also in the rotary joint, when a seal material provided to seal a flow passage to which the working fluid is supplied inside the rotary joint deteriorates and the seal performance thereof is lowered, the working fluid supplied to the flow passage may leak into the space within the frame. In such a state, an operation of the device such as a jig unit to which the working fluid is supplied via the rotary joint is not normally performed, so there may occur a problem in that an operation of the rotation indexing device is not performed normally.

However, the machine tool of the related art is not provided with a means for detecting leakage of the working fluid inside the frame of the rotation indexing device, which causes the problems described above. For this reason, even when the problems described above occur, it cannot be immediately determined that the cause is due to the leakage of the working fluid, and there may be a concern that the cause (the state in which the working fluid has leaked) will remain unsolved.

SUMMARY

In view of the above problems in the machine tools of the related art, the present invention is to provide a machine tool including the rotation indexing device as described above with a configuration by which it is possible to detect leakage of the working fluid supplied to the rotation indexing device into the space within the frame.

A preamble of the present invention is a machine tool including:

a rotation indexing device for indexing an angular position of a rotation target member attached to an end portion of a rotary shaft, the rotation indexing device including: a clamp device configured to maintain the rotary shaft at an indexed angular position; and an air purge device configured to supply compressed air to a space within a frame to increase an internal pressure in the space and including a pressure regulator provided in a supply pipe conduit connecting a supply source of the compressed air and the frame.

In addition, in the present invention, the machine tool includes an abnormality determination device including: a pressure sensor provided on the frame side with respect to the pressure regulator in the supply pipe conduit, and configured to output a pressure signal according to a pressure in the supply pipe conduit; and a determinator configured to determine presence or absence of an abnormality, based on the pressure signal from the pressure sensor.

Further, in the machine tool according to the present invention, the pressure sensor may be a pressure switch.

According to the present invention, the machine tool including the rotation indexing device on the preamble as described above includes the pressure sensor provided for the supply pipe conduit in the air purge device and configured to output a pressure signal corresponding to a pressure in the pipe conduit. In addition, the pressure sensor is provided on the frame side of the rotation indexing device with respect to the pressure regulator in the supply pipe conduit. Thereby, the pressure detected by the pressure sensor becomes substantially the same as the internal pressure within the frame of the rotation indexing device.

Further, the machine tool according to the present invention includes the determinator configured to determine the presence or absence of an abnormality, based on a pressure signal from the pressure sensor. Thereby, when the working fluid leaks into the space within the frame of the rotation indexing device as described above and the internal pressure in the space increases to an abnormal pressure, it is detected by the pressure sensor, and the state is determined as being abnormal by the determinator, based on a pressure signal corresponding to the abnormal pressure.

Therefore, according to the machine tool of the present invention including the pressure sensor and the abnormality determination device, when the working fluid leaks into the space within the frame of the rotation indexing device, the state is determined (detected) as being abnormal by the abnormality determination device. Therefore, in the machine tool, for example, the state determined as being abnormal is displayed on an indicator or the like, allowing an operator to perceive the state.

In this way, according to the machine tool of the present invention, since the abnormality determination device that detects that the working fluid has leaked into the space within the frame of the rotation indexing device is provided to allow the operator to perceive the detection result by an appropriate means. Therefore, the operator can perceive that an operation of a device that is operated by the working fluid in the rotation indexing device is not performed normally and the cause thereof is the leakage of the working fluid into the space within the frame. Therefore, according to the machine tool, in the case described above, it is possible to prevent a state in which the cause will remain unsolved.

Further, in the machine tool of the present invention, the configuration in which the pressure switch is provided as the pressure sensor makes it possible to implement the machine tool of the present invention with a simpler configuration. Thereby, it is possible to suppress the manufacturing cost of the machine tool.

DESCRIPTION OF EMBODIMENTS

Hereinafter, one embodiment (embodiment) of a machine tool to which the present invention is applied will be described with reference to the drawings.

Figure 1:
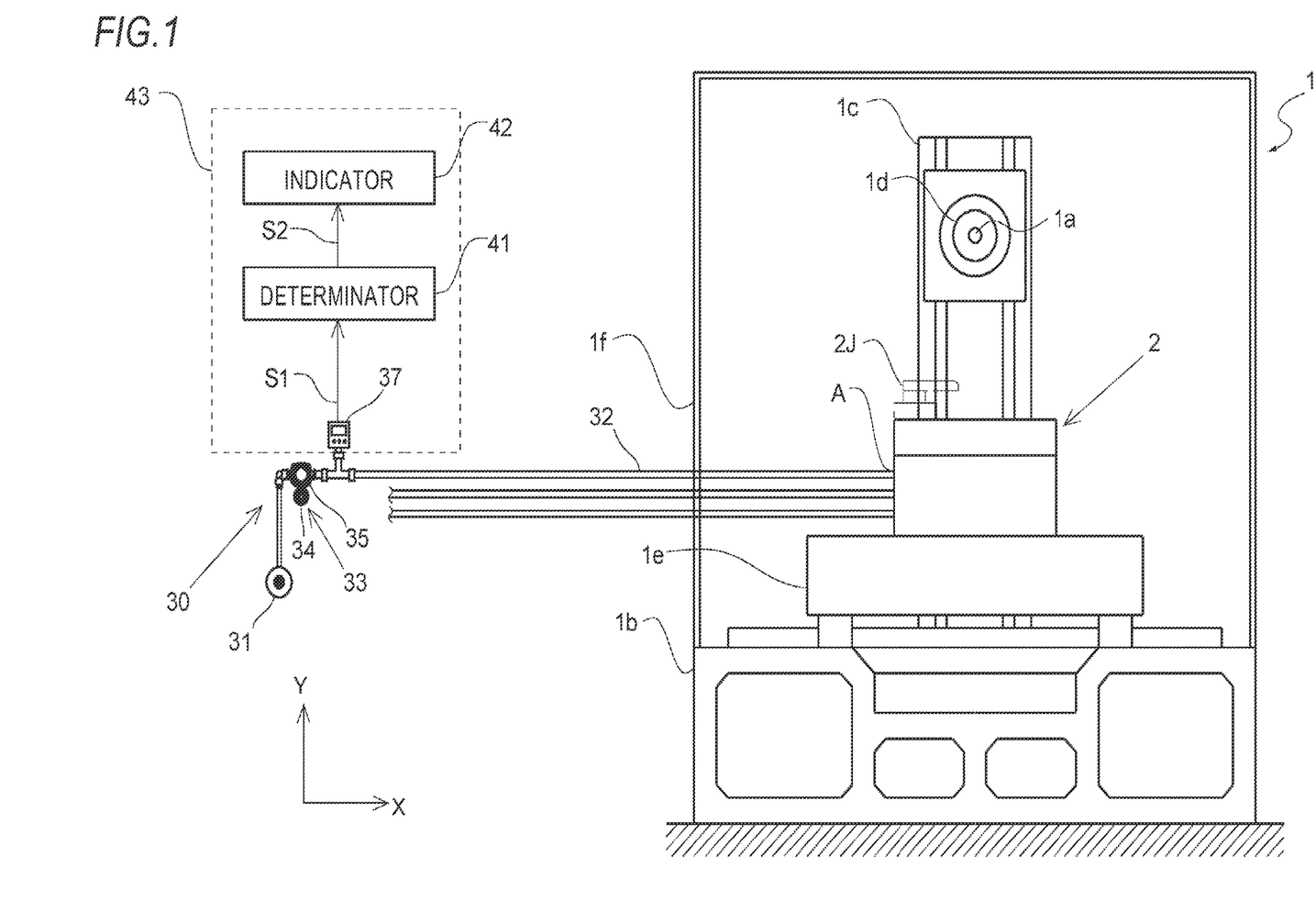
FIG. 1 is a front view, showing one embodiment of a machine tool to which the present invention is applied.

FIG. 1 shows a machine tool 1 to which the present invention is applied. As shown, the machine tool 1 is a machine tool 1 (so-called horizontal type machining center) in which a direction of a rotation axis line of a main shaft 1a is parallel to a horizontal direction. In addition, the machine tool 1 includes a bed 1b serving as a base, a column 1c supported to be movable in an X-axis direction of the horizontal direction with respect to the bed 1b, a main shaft head 1d supported to be movable in a Y-axis direction that is a vertical direction with respect to the column 1c, and a table 1e provided on the bed 1b to be movable in Z-axis direction of the horizontal direction orthogonal to the X-axis direction and the Y-axis direction. Note that the machine tool 1 is provided with a housing-type exterior cover 1f. The exterior cover 1f is attached to the bed 1b in the form of covering an area above the bed 1b including a machining area of the machine tool 1 where a workpiece is machined.

In addition, the machine tool 1 has a rotation table device 2 serving as a rotation indexing device for indexing an angular position of a workpiece. The rotation table device 2 is provided in the form of being placed on the table 1e of the machine tool 1.

Figure 2:
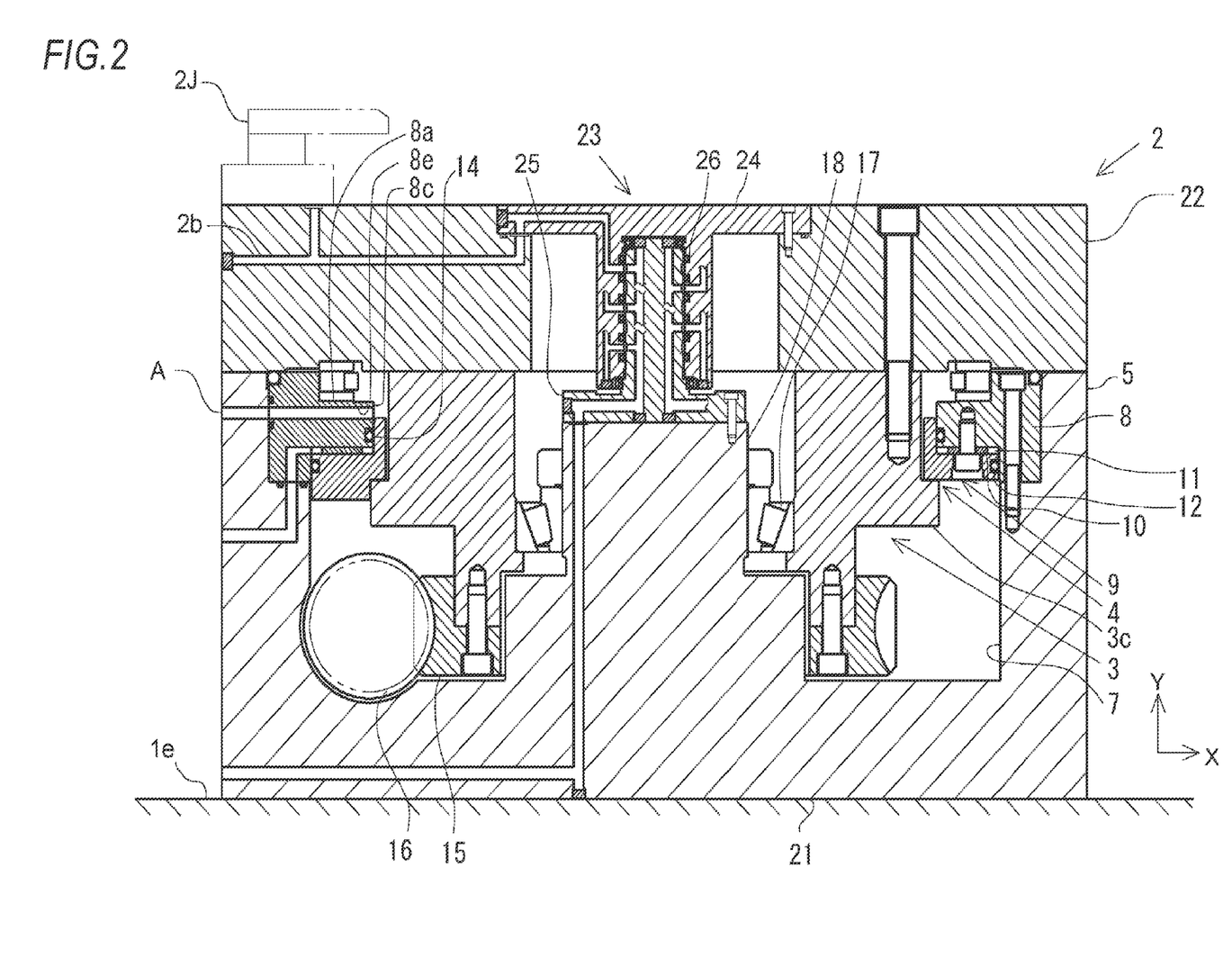
FIG. 2 is a front cross-sectional view showing a rotation indexing device of the machine tool in FIG. 1.
Figure 3:
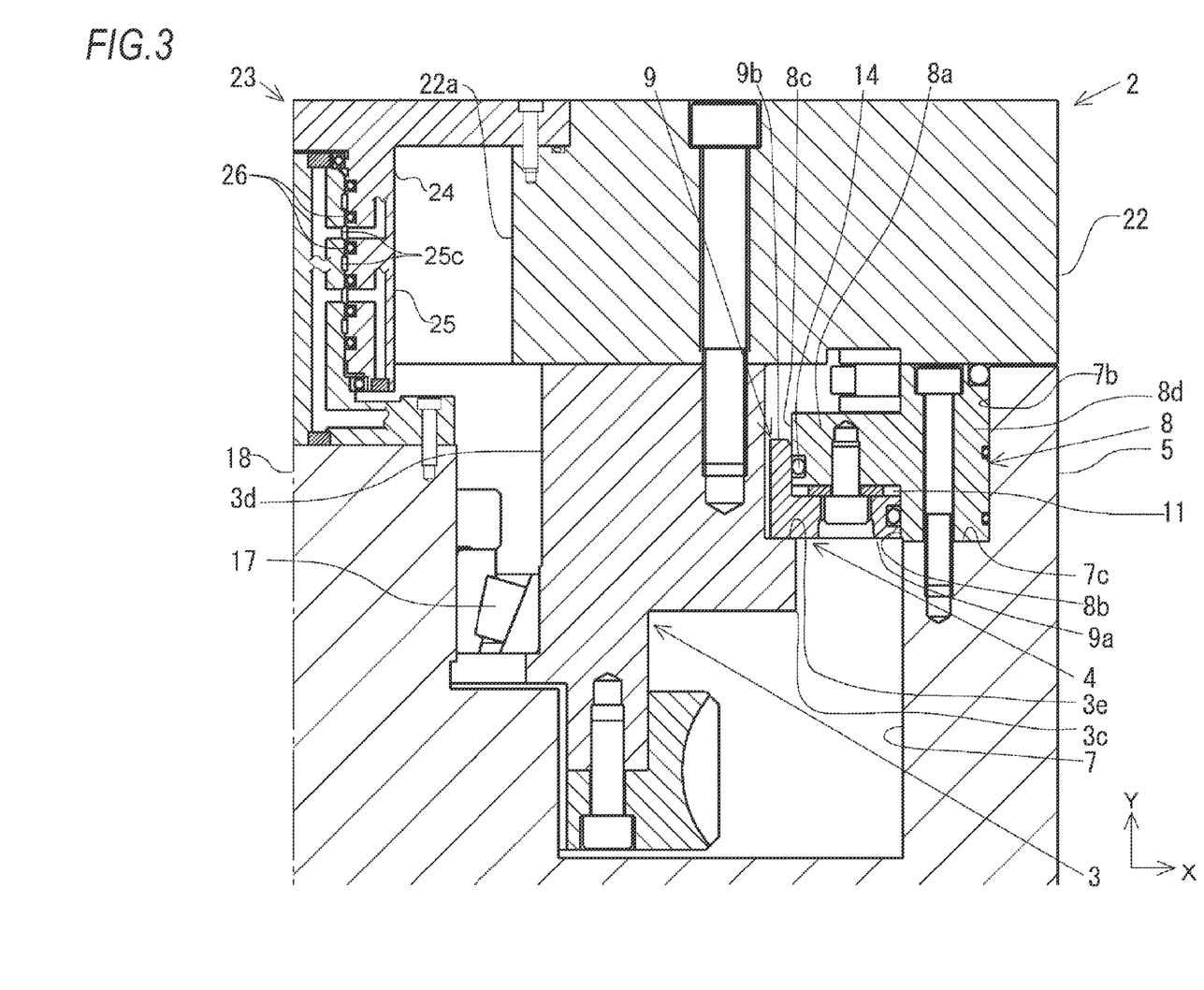
FIG. 3 is a partially enlarged cross-sectional view showing a main part in FIG. 2.

As shown in FIGS. 2 and 3, the rotation table device 2 includes a frame 5 attached to the machine tool 1, a main shaft 3 supported to be rotatable with respect to the frame 5, and a circular table 22 attached not to be relatively rotatable with respect to the main shaft 3 at one end portion of the main shaft 3. Note that the rotation table device 2 is a so-called horizontal type rotation table device installed with an axis line of the main shaft 3 being directed in a vertical direction.

In addition, as for the rotation table device 2, the frame 5 has a configuration in which an accommodation hole 7 opening on a surface opposite to an installation surface 21 to the machine tool 1 (table 1e) is formed. However, the accommodation hole 7 is a bottomed hole closed on the installation surface 21 side. Further, the frame 5 has a cylindrical shaft part 18 extending vertically from a bottom surface of the accommodation hole 7 and formed concentrically with the accommodation hole 7.

The main shaft 3 is a shaft formed so that a through-hole 3d having an inner diameter slightly larger than an outer diameter of a shaft part 18 in the frame 5 penetrates in its axis line direction. In addition, the main shaft 3 is formed so that an outer diameter of a portion on one end side with respect to a middle portion in the axis line direction is larger than that of a portion on the other end side. Further, the main shaft 3 has a collar portion 3c provided on the other end side where the outer diameter is larger and having an outer diameter larger than other portions. For reference, the outer diameter of the collar portion 3c is such that a predetermined gap is formed between the collar portion and an inner circumferential surface of the accommodation hole 7.

The main shaft 3 is provided in the accommodation hole 7 of the frame 5 in such an arrangement that the shaft part 18 of the frame 5 is located in the through-hole in a direction in which the other end side is the bottom side of the accommodation hole 7 of the frame 5. In addition, a bearing 17 is mounted between the shaft part 18 of the frame 5 and the main shaft 3 (inner circumferential surface of the through-hole 3d), whereby the main shaft 3 is supported to be rotatable with respect to the frame 5.

The circular table 22 is a disc-shaped member whose outer diameter dimension is larger than an inner diameter dimension of the accommodation hole 7 of the dimension frame 5, and has a center hole 22a penetrating in a thickness direction at a center thereof. Note that one of both end faces of the circular table 22 in the thickness direction is a placement surface for attaching a workpiece or the like, which is a machining target. In addition, the circular table 22 is fixed not to be relatively rotatable with respect to the main shaft 3 by a plurality of attachment bolts in such a form that the other of both the end faces is attached to one end side of the main shaft 3.

Further, the rotation table device 2 includes a worm wheel 15 attached not to be relatively rotatable with respect to the main shaft 3, and a worm spindle 16 supported to be rotatable with respect to the frame 5 and engaged with the worm wheel 15. The rotation table device 2 is configured such that when the worm spindle 16 is rotationally driven by a drive motor (not shown), the main shaft 3 (circular table 22) is rotationally driven via the worm wheel 15, and an amount of rotation of the drive motor is controlled, so that an angular position of the circular table 22 is indexed.

In addition, the rotation table device 2 includes a clamp device 4 for clamping the circular table 22 to the angular position indexed as described above. The clamp device 4 includes a clamp piston 9 provided to be movable in the axis line direction in the accommodation hole 7 of the frame 5, and an annular cylinder member 8 attached to the frame 5 in order to form a pressure chamber, to which a working fluid is supplied, together with the clamp piston 9. The more detailed descriptions are as follows.

Note that the frame 5 has a configuration in which a diameter-enlarged portion 7b having an enlarged inner diameter is formed at an end portion on the circular table 22 side in the accommodation hole 7, and therefore, a stepped portion 7c is provided in the accommodation hole 7. In addition, a position of the stepped portion 7c in the axis line direction is substantially the same as a position of a surface of the collar portion 3c of the main shaft 3 facing toward the circular table 22.

In addition, the cylinder member 8 is attached to the frame 5 by a plurality of attachment bolts in a state of being fitted to the diameter-expanded portion 7b and abutting against the stepped portion 7c. Further, the cylinder member 8 has a through-hole 8c having an inner diameter in which the main shaft 3 can be placed. However, the inner diameter of the through-hole 8c in the cylinder member 8 is smaller than an inner diameter of a portion 7b of the accommodation hole 7 except the enlarged diameter portion, and is substantially the same as the outer diameter of the collar portion 3c of the main shaft 3. Thereby, the cylinder member 8 radially protrudes inward from the inner circumferential surface of the accommodation hole 7 in the state of being attached to the frame 5 (attached state).

For reference, a thickness dimension (dimension in the axis line direction) of a protruding portion (protrusion) 8a of the cylinder member 8 is smaller than a thickness dimension of a portion (attachment portion) 8d fitted to the diameter-enlarged portion 7b. In addition, the cylinder member 8 is configured such that the protrusion 8a is located closer to the circular table 22 in the axis line direction than the stepped portion 7c of the frame 5 against which the attachment portion 8d abuts in the attached state. Therefore, the attachment portion 8d of the cylinder member 8 has an inner circumferential surface that is exposed within the accommodation hole 7 within a range in the axis line direction excluding the protrusion 8a, and a portion (lower inner circumferential wall) 8b of the inner circumferential surface on the bottom side of the accommodation hole 7 with respect to the protrusion 8a is continuously flush with the inner circumferential surface of the portion of the accommodation hole 7 except the diameter-enlarged portion 7b.

The clamp piston 9 is an annular member having a through-hole as a whole, and is configured by a disc portion 9a forming a disc shape and a cylindrical portion 9b formed to protrude in a thickness direction on an inner circumferential end side of the disc portion 9a. Note that an inner diameter of the through-hole of the clamp piston 9 is slightly larger than an outer diameter of a portion of the main shaft 3 on the circular table 22 side with respect to the collar portion 3c, and is smaller than an outer diameter of the collar portion 3c.

In addition, an outer diameter of the disc portion 9a is substantially the same as an inner diameter of the lower inner circumferential wall 8b of the cylinder member 8 (an inner diameter of a portion of the accommodation hole 7 excluding the diameter-enlarged portion 7b). Further, a thickness dimension of the disc portion 9a is smaller than an interval between the protrusion 8a of the cylinder member 8 and the collar portion 3c of the main shaft 3 in the axis line direction. Further, an outer diameter of the cylindrical portion 9b is substantially the same diameter as the inner diameter of the through-hole 8c of the cylinder member 8.

In addition, the clamp piston 9 is provided such that the disc portion 9a is located between the collar portion 3c of the main shaft 3 and the protrusion 8a of the cylinder member 8 in a direction in which the main shaft 3 penetrates the through-hole and the cylindrical portion 9b is located on the circular table 22 side. Note that, in the clamp piston 9, the cylindrical portion 9b has a dimension in the axis line direction overlapping the protrusion 8a in a state in which the disc portion 9a abuts against the collar portion 3c. Therefore, the clamp piston 9, in the state provided as described above, is in a state of slidably abutting against the lower inner circumferential wall 8b of the cylinder member 8 on the outer circumferential surface of the disc portion 9a, and slidably abutting against the inner circumferential surface of the protrusion 8a on the outer circumferential surface of the cylindrical portion 9b.

The clamp piston 9 is provided in this way, so that the rotation table device 2 can form a space 11 between the cylinder member 8 and the clamp piston 9, which is defined by a surface of the protrusion 8a, which faces the disc portion 9a, and the lower inner peripheral wall 8b of the cylinder member 8 and a surface of the disc portion 9a, which faces the protrusion 8a, and the outer circumferential surface of the cylindrical portion 9b of the clamp piston 9. The space 11 becomes a pressure chamber in the clamp device 4. Therefore. O-rings 12 and 14 are each mounted between the outer circumferential surface of the disc portion 9a of the clamp piston 9 and the lower inner circumferential wall 8b of the cylinder member 8 and between the cylindrical portion 9b of the clamp piston 9 and the inner circumferential surface of the protrusion 8a of the cylinder member 8 abutting each other as described above.

Further, the rotation indexing device 2 includes a rotary joint 23 for supplying the working fluid to a jig 2J and the like on the circular table 22 via a flow passage 2b of the circular table 22. The rotary joint 23 is known per se, and is configured by a distributor 25 fixed to the frame 5 (shaft part 18) and a cylindrical shaft 24 fitted to be relatively rotatable with respect to the distributor 25 and attached to the circular table 22.

In addition, each of the distributor 25 and the shaft 24 is formed with a flow passage according to the number of jigs 2J or the like to which the working fluid is supplied, and the flow passage on the distributor 25 side and the flow passage on the shaft 24 side are configured to communicate with each other via grooves 25c formed over an outer circumference of the distributor 25. Further, O-rings 26 for preventing leakage of the working fluid are mounted on both sides of each groove 25c in the axis line direction between an inner circumferential surface of the shaft 24 and an outer circumferential surface of the distributor 25.

Figure 4:
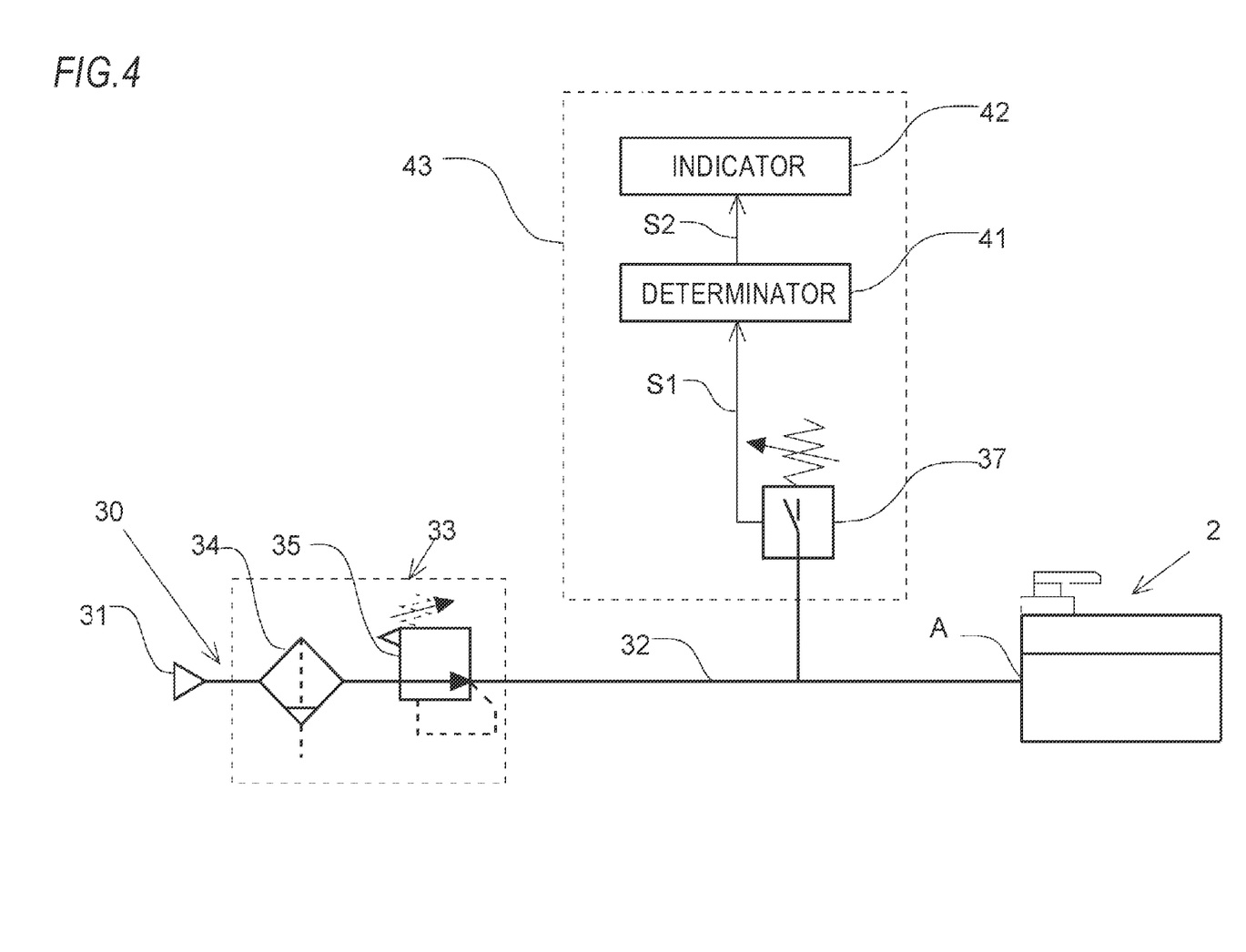
FIG. 4 is a circuit diagram showing an abnormality determination device of the machine tool in FIG. 1.

In addition, the machine tool 1 including the rotation table device 2 described above includes an air purge device 30 that supplies compressed air to the space within the frame 5 of the rotation table device 2 in order to increase an internal pressure in the space. The air purge device 30 is configured by a supply pipe conduit 32 connecting a supply source 31 of the compressed air and the frame 5, and a regulator 33 provided in the supply pipe conduit 32.

In the rotation table device 2, the frame 5 is formed with a connection port A to which the supply pipe conduit 32 of the air purge device 30 is connected. Although not shown in detail, the connection port A is provided such that the supply pipe conduit 32 can be connected at an outer end of a through-hole perforated to open to the inner circumferential surface of the diameter-expanded portion 7b of the frame 5 and the outer surface of the frame 5. Further, the cylinder member 8 is formed with a through-hole 8e that communicates with the connection port A (the through-hole) and penetrates in a radial direction. However, the through-hole 8e is formed to open to the inner circumferential surface of the protrusion 8a (the inner circumferential surface of the through-hole 8c) on the circular table 22 side with respect to the O-ring 14 in the axis line direction.

Thereby, the compressed air supplied from the supply source 31 is supplied from the supply pipe conduit 32 of the air purge device 30 to the space in the frame 5 via the connection port A and the through-hole Se of the rotation table device 2. The compressed air is supplied in this way, so that the pressure in the space is maintained higher than the atmospheric pressure and cutting oil or the like is prevented from entering the space.

In such an air purge device 30, the regulator 33 is provided in the supply pipe conduit as described above on an outer side of the exterior cover 1f of the machine tool 1. The regulator 33 is known per se, and is configured by a pressure regulator 34 for regulating a pressure of the compressed air supplied from the supply source 31 to a desired pressure, and an exhaust valve 35 for exhaust (decompression) when a pressure downstream of the pressure regulator 34 becomes an abnormal pressure. Therefore, the pressure of the compressed air supplied to the space as described above is regulated to a desired pressure by the pressure regulator 34. In addition, when an internal pressure in the space becomes an abnormal pressure on the downstream side of the pressure regulator 34, the compressed air in the space is exhausted through the exhaust valve 35 to reduce the internal pressure.

In the machine tool 1 described above, the present invention includes an abnormality determination device including a pressure sensor configured to output a pressure signal according to a pressure in the supply pipe conduit 32, and a determinator configured to determine presence or absence of an abnormality, based on the pressure signal from the pressure sensor. In addition, the present embodiment described below is an example in which a pressure switch is adopted as the pressure sensor The machine tool 1 of the present embodiment is described in detail, as follows.

As described above, the machine tool 1 includes, as a constitutional element of the abnormality determination device, a pressure switch 37 that outputs a pressure signal St according to a pressure in the supply pipe conduit 32, and a determinator 41 that determines presence or absence of an abnormality, based on the pressure signal S1 from the pressure switch 37. In addition, the abnormality determination device 43 includes an indicator 42 that displays a determination result of the determination unit 41.

Among them the pressure switch 37 is provided in the form of being installed in the supply pipe conduit 32 at a position between the regulator 33 of the air purge device 30 and the frame 5 of the rotation table device 2. That is, the pressure switch 37 is provided on the frame 5 side with respect to the pressure regulator 34 in the supply pipe conduit 32. Thereby, the pressure of the compressed air acting on the pressure switch 37 becomes substantially the same as the pressure in the frame 5 of the rotation indexing device 2.

Note that the pressure switch 37 has a configuration in which an electrical contact is closed (energized) when the pressure of the compressed air acting on the pressure switch exceeds a set pressure (set pressure). For reference, the set pressure is set to a pressure higher than the pressure regulated by the pressure regulator 34 of the air purge device 30, for example, to an atmospheric pressure+0.1 MPa.

In addition, the determinator 41 is provided in a control device (not shown) provided for the machine tool 1. Further, the determinator 41 is connected to the pressure switch 37 at its input terminal. The determinator 41 is configured to determine an abnormality in pressure in the supply pipe conduit 32 according to the pressure signal S1 from the pressure switch 37. Specifically, the determinator 41 is configured to output an abnormality signal S2 indicating that an abnormality has occurred in the pressure in the supply pipe conduit 32, when the pressure signal S1 is input to the input terminal of the determinator.

Note that, as described above, the pressure in the supply pipe conduit 32 at the position where the pressure switch 37 is provided is substantially the same as the pressure in the frame 5 of the rotation indexing device 2. Therefore, the abnormality in pressure in the supply pipe conduit 32 is regarded as an abnormality in pressure in the frame 5. In addition, since the determinator 41 outputs the abnormality signal S2 when the pressure signal S1 is input, it can be considered that the determinator determines that the abnormality has occurred, based on the pressure signal S1.

In addition, the indicator 42 displays a determination result by the determinator 41 as described above. Therefore, the indicator 42 has a display screen (not shown) for displaying the determination result. Further, the indicator 42 is connected to the determinator 41 at its input terminal. The indicator 42 is configured so that an error message such as "Frame pressure abnormality" is displayed on the display screen when the abnormality signal S2 is input to its input terminal. Note that the indicator 42 is provided at a position outside the exterior cover 1f of the machine tool 1 where an operator can see the display screen.

In the machine tool 1 including the rotation indexing device 2 described above, for example, when the O-rings 12 and 14 of the clamp device 4 of the rotation indexing device 2 are deteriorated or damaged and the seal performance thereof deteriorates, the working fluid leaks from the space 11 (pressure chamber) to the space in the frame 5, so that the pressure in the space may become an abnormal pressure exceeding the set pressure. When the pressure in the space within the frame 5 becomes such an abnormal pressure, the pressure on the frame 5 side with respect to the pressure regulator 34 in the supply pipe conduit 32 connected to the frame 5 also becomes the same pressure as the abnormal pressure.

The abnormal pressure acts on the pressure switch 37 provided in the supply pipe conduit 32 on the frame 5 side with respect to the pressure regulator 34, so that the electrical contact of the pressure switch 37 is closed and the pressure signal S1 is output from the pressure switch 37 toward the determinator 41 of the abnormality determination device 43. In addition, along with the input of the pressure signal S1 to the determinator 41, the determinator 41 outputs the abnormality signal S2 indicating that an abnormality has occurred in the pressure toward the indicator 42. Then, the above-described error message indicating the abnormality in pressure is displayed on the indicator 42, thereby allowing the operator to check that the abnormality in pressure has occurred in the space within the frame 5.

Thereby, in the case where an abnormal state in which the clamp device 4 does not operate normally occurs in the rotation table device 2, when the cause is the leakage of the working fluid into the frame 5 as described above, the operator can easily perceive the cause. Therefore, in this case, it is possible to prevent a state in which the cause will remain unsolved. In the above, the case where the seal performance of the clamp device 4 is lowered has been described. However, also in a case where the seal performance of the rotary joint 23 is lowered, similar actions and effects are obtained.

In the above, one embodiment of machine tool of the present invention has been described. However, the machine tool of the present invention is not limited to the above embodiment, and can also be implemented in following modified forms.

(1) As for the abnormality determination device, in the above embodiment, the abnormality determination device adopts, as the pressure sensor, the pressure switch whose electrical contact is closed when the acting pressure exceeds the set pressure. However, the abnormality determination device of the present invention may adopt, as the pressure sensor, for example, a pressure detector that outputs a pressure signal corresponding to a magnitude of an acting pressure.

Figure 5:
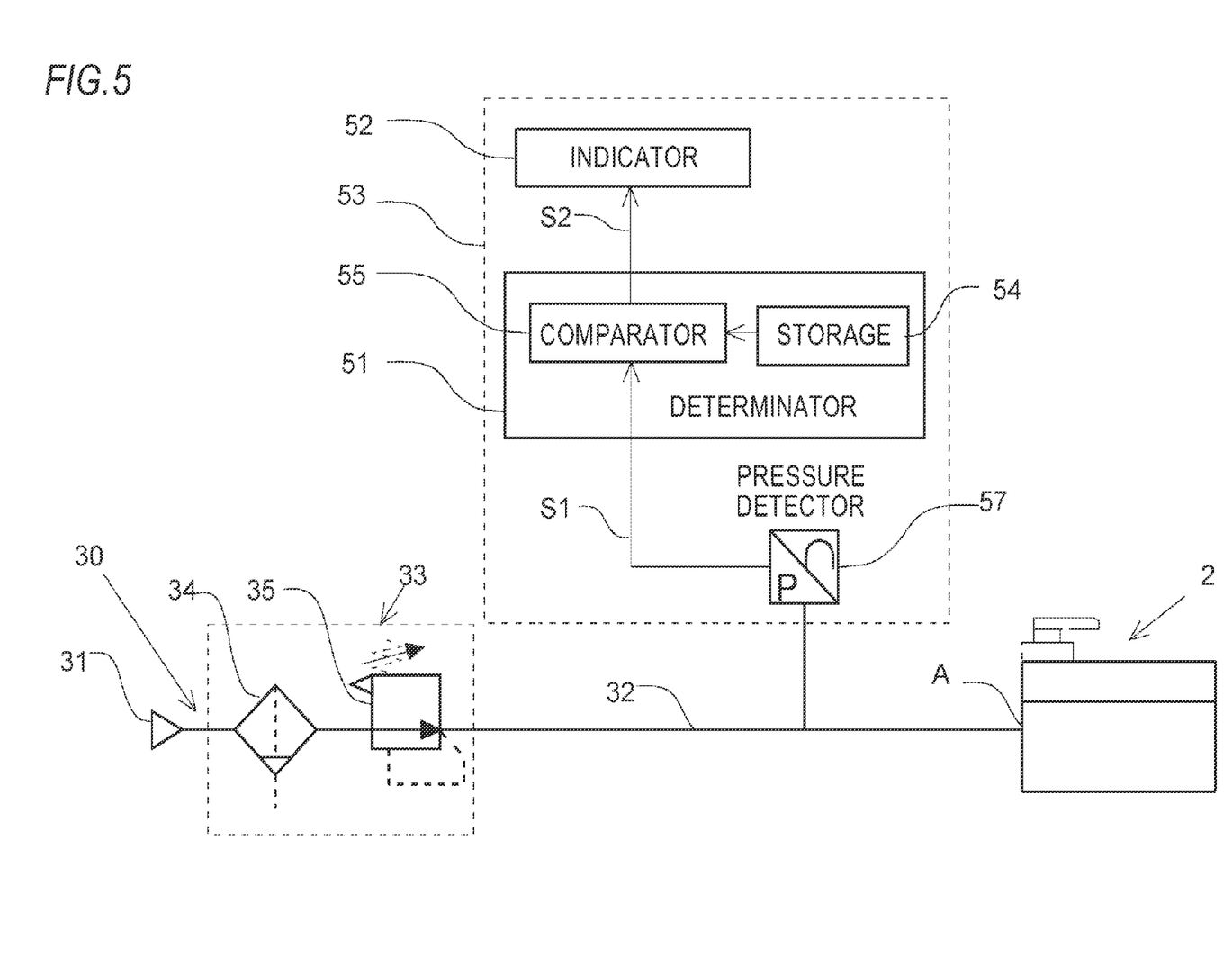
FIG. 5 is a circuit diagram showing another embodiment of the machine tool to which the present invention is applied.

Note that, in such a case where the pressure detector is adopted as the pressure sensor, the determinator of the abnormality determination device includes a storage in which a threshold value is set, as shown in FIG. 5, and a comparator that compares the threshold value with a pressure signal from the pressure detector and determines whether the pressure signal exceeds the threshold value. When the pressure signal exceeds the threshold value, the comparator may output an abnormality signal. In the case of adopting such a pressure detector, a numerical value corresponding to the pressure signal may be displayed on the display screen of the indicator.

In addition, in the above embodiment, the abnormality determination device has the indicator that displays an error message on the display screen, based on the determination result in the determinator. That is, the abnormality determination device is provided with the indicator as a means (an abnormality warning means) for notifying an operator of an abnormality. However, even when the abnormality determination device of the present invention is provided with such an abnormality warning means, the abnormality warning means is not limited to the indicator described above, and may also be a warning light that notifies an abnormality by lighting or a warning device that notifies an abnormality by a warning sound.

Further, the abnormality determination device is not limited to having such an abnormality warning means, and may also be configured to output an abnormality signal to the machine tool. In this case, the abnormality signal is used in the control device of the machine tool. Note that, as a use of the abnormality signal by the control device, for example, it is considered not to operate the machine tool when an abnormality signal is input.

(2) As for the clamp device of the rotation indexing device, in the above embodiment, a so-called disc-type clamp device in which the rotary shaft is maintained by the clamp piston capable of moving in the axis line direction of the rotary shaft is adopted as the clamp device. However, the clamp device is not limited to such a disc-type clamp device, and may also be a so-called sleeve-type clamp device in which the rotary shaft is maintained by a clamp sleeve. In addition, the clamp device is not limited to maintaining the rotary shaft by frictional force, such as the disc type or sleeve type described above, and may also be a so-called coupling-type clamp device in which the rotary shaft is maintained by mechanical engagement between engagement teeth on the rotary shaft side and a coupling on the frame side.

Note that the clamp device may be a so-called hydraulic type clamp device in which operating oil is supplied as the working fluid, or a so-called pneumatic type clamp device in which compressed air is supplied as the working fluid. In addition, the clamp device is not limited to supplying the working fluid of the same pressure as the supply source, such as the hydraulic or pneumatic type described above, and may also be a so-called pneumatic/hydraulic type clamp device in which a pressure of the compressed air supplied from the supply source is converted into a pressure of the operating oil by a pneumatic/hydraulic converter and the operating oil of the converted pressure is supplied as the working fluid.

(3) As for the rotation indexing device included in the machine tool that is the preamble of the present invention, in the above embodiment, a so-called horizontal type rotation table device whose axis line of the main shaft is installed in the vertical direction is adopted as the rotation indexing device. However, when the rotation table device is adopted as the rotation indexing device, the rotation table device is not limited to the horizontal type rotation table device as described above, and may also be a so-called vertical type rotation table device whose axis line of the main shaft is installed in the horizontal direction.

Further, the rotation indexing device to which the present invention is applied is not limited to the rotation table device described above. For example, the present invention may also be applied to a tilt indexing part (or rotation indexing part) of a so-called tilt circular table device having two types of rotation indexing devices, i.e., a tilt indexing part and a rotation indexing part. In addition, the present invention is not limited to being applied to a rotation indexing device that indexes an angular position of a machining target, such as the rotation table device described above or the tilt circular table device, and may also be applied to a so-called angle indexing device of a milling head, which is configured to index an angular position of a main shaft spindle (corresponding to the rotation target member) supported by a support shaft (corresponding to the rotary shaft).

Further, in the above embodiment, the rotation indexing device is provided with the rotary joint for supplying a working fluid to the jig or the like provided on the rotation target member. However, the rotation indexing device is not limited to having such a rotary joint.

The present invention is not limited to any embodiment described above, and can be appropriately changed without departing from the gist of the present invention.

The invention claimed is:

1. A machine tool comprising:
a rotation indexing device for indexing an angular position of a rotation target member attached to an end portion of a rotary shaft, the rotation indexing device including: a clamp device configured to maintain the rotary shaft at an indexed angular position; and an air purge device configured to supply compressed air to a space within a frame to increase an internal pressure in the space and including a pressure regulator provided in a supply pipe conduit connecting a supply source of the compressed air and the frame, and
an abnormality determination device including: a pressure sensor provided on the frame side with respect to the pressure regulator in the supply pipe conduit, the pressure sensor being configured to output a pressure signal according to a pressure in the supply pipe conduit; and a determinator configured to determine presence or absence of an abnormality, based on the pressure signal from the pressure sensor.

2. The machine tool according to claim 1, wherein the pressure sensor is a pressure switch.

* * * * *